UNITED STATES PATENT OFFICE

BRUCE K. BROWN, OF TERRE HAUTE, INDIANA, ASSIGNOR TO COMMERCIAL SOLVENTS CORPORATION, OF TERRE HAUTE, INDIANA, A CORPORATION OF MARYLAND

PRODUCTION OF KETONES

No Drawing.        Application filed July 31, 1926. Serial No. 126,347.

My invention relates to the production of organic compounds by the interaction of olefine hydrocarbons with acetone at elevated temperature and pressure. The invention relates more particularly to the production of aliphatic ketones.

I have discovered that under the influence of elevated temperature and pressure, and in the presence of suitable catalysts, the olefine hydrocarbons will react with acetone to produce ketones in accordance with the following equation, where R represents a hydrocarbon grouping such as a $CH_3$ group, a $CH_3$—$CH_2$ group, et cetera:—

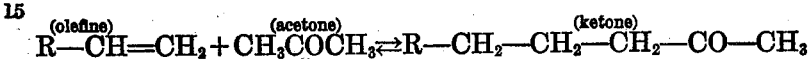

$$\underset{\text{(olefine)}}{R-CH=CH_2} + \underset{\text{(acetone)}}{CH_3COCH_3} \rightleftharpoons \underset{\text{(ketone)}}{R-CH_2-CH_2-CH_2-CO-CH_3}$$

In the case of the simplest olefine—i. e. ethylene—the R group is replaced by hydrogen, and the reaction product is mainly propyl methyl ketone.

Under the influence of elevated pressure and temperature, and especially in the presence of a catalyst, some of the lower olefines, particularly ethylene, are condensed or polymerized with themselves, producing hydrocarbons of higher molecular weight, particularly unsaturated hydrocarbons. This reaction occurs to some extent, even in the presence of acetone, so as a by-product of my process some hydrocarbons are obtained.

Acetone—per se—is not easily decomposed under elevated pressure, but some decomposition may occur, with the resultant giving off of methane, which in turn may react with the olefines present, producing small quantities of saturated hydrocarbons.

These by-products, however, occur only in small quantity, the main reaction being the production of ketones as explained. The presence of an excess, over molecular proportions, of olefines in the reaction is thus seen to tend to produce hydrocarbons. An excess of olefines may also produce ketones of high molecular weight, owing to the reaction of a previously formed ketone with more olefine.

The process operates most successfully from the technical and economic standpoint when the lower olefine hydrocarbons are employed. For example ethylene and acetone react to form propyl methyl ketone (B. P. 102° C.) and propylene and acetone produce butyl methyl ketone (B. P. 127° C.). Nevertheless the higher olefines react in the same manner although more slowly and less satisfactorily—presumably on account of the molecular size and general inertness of long hydrocarbon chains.

In the case of butylene and amylene the ketones produced vary in structure with the structure of the reacted olefine, numerous isomers of which exist.

It is not necessary to the practice of my process that acetone be reacted with one pure olefine hydrocarbon. Mixtures of olefines may be employed. Such mixtures are commercially available in the form of natural gas fractions and still gases from petroleum cracking. Further the presence of foreign gases in these mixtures will not inhibit the reaction. The presence of saturated hydrocarbons in large quantities will result in the formation of hydrocarbons of higher molecular weight, in preference to ketones, but small quantities of hydrocarbons present in olefine gases do not inhibit the reaction.

In conducting my process I pass a mixture, preferably in molecular proportions, of olefine gas and acetone vapor over a suitable catalyst at a pressure of 50 atmospheres or above and at a temperature which may vary from 250–550° C. Increased pressure produces a greater rapidity of reaction, and I prefer to employ pressures of about 2000–3000 pounds.

After passing the gases over the catalyst, the vapors are cooled and the products of the reaction are separated by ordinary means such as distillation. If cooled under pressure all of the constituents of the vapor may be liquefied, in which case it is possible to recover residual olefine vapors by slowly "blowing off" the pressure over the liquid. The remaining constituents may then be separated by ordinary fractional distillation. If desired the condensation under pressure may be accomplished at a temperature slightly above the critical temperature of ethylene (10° C.) in which case the residual ethylene vapors may be drawn off under pressure in gaseous form.

Instead of liquefying the reacted vapors by cooling, the pressure may be released and the gases then cooled whereupon acetone and the resultant higher ketones will be recovered in liquid form whereas the olefines may be retained as gases.

In operating my process I prefer to work at a low space velocity and to pass the reacting gases over sufficient catalyst so that the reaction is made complete in one operation and any residual gases may be economically discarded. To this end I may employ a series of catalytic chambers. However my invention is not limited in this manner, and includes the variation of securing only a partial reaction at one passage of gas, followed by a recovery of the unreacted constituents and their subsequent circulation.

Catalysts suitable for the promotion of the reaction are those catalytic substances which are generally useful as hydrogenating or dehydrogenating catalysts, the exact function being dependent on the pressure and temperature conditions of their employment.

This group includes the heavy metals and their oxides, for example copper, zinc, iron, nickel, cobalt, platinum, palladium, chromium, etc. Metal oxides, the metal of which is not practicably obtainable, for example tungstic oxide, vanadium oxide, and molybdenum oxide, are also suitable. These catalysts may be used singly or in admixture for the promotion of the reaction. Metallic halides, particularly chlorides, may be added to oxide catalysts with the attainment of improved results.

The following are directly illustrative of suitable catalysts: granular zinc oxide, zinc oxide moistened with zinc chloride, nickel, reduced copper oxide, zinc oxide—chromium oxide mixture moistened with ferric chloride, copper—vanadium oxide.

Now having generally described my invention I shall give two illustrative examples of its practice.

Example I

The vapors of acetone and ethylene in approximately molecular proportion are passed at a pressure of 1000 pounds over a catalyst comprising a major portion of zinc oxide and a minor portion of chromium oxide moistened with zinc chloride solution and dried in granular form. The catalyst temperature is maintained at 450–500° C. and the space velocity of passage is reduced to a low figure in order to allow ample contact time. After passage over the catalyst, the gases are cooled to a temperature of about 0°–15° C., whereupon the mixture of ketones, acetone, and ethylene is liquefied. The liquid product is drawn off and the compounds separated by fractional distillation. Propyl methyl ketone is produced, together with smaller quantities of hydrocarbons.

In place of the zinc oxide-chromium oxide-zinc chloride catalysts, other catalysts may be used, as previously stated.

Example II

A mixture of olefine hydrocarbons (ethylene and propylene) and acetone vapor in such proportion that the acetone and olefine are present, molecule for molecule, are passed at a pressure of 2000 pounds over a nickel oxide catalyst at a temperature of 300–350° C. The reacted gases are cooled to about 0–15° C. and the liquid products are separated by distillation. The resultant reaction product will consist largely of propyl methyl ketone, butyl methyl ketone together with traces of higher ketones and hydrocarbons.

In place of the nickel oxide catalyst, other metal oxides or active metal catalysts may be used as previously stated.

In the appended claims the synthesis of ketones and hydrocarbons is mentioned. This synthesis is brought about by the interaction of a hydrocarbon (olefine) and a ketone (acetone) in the manner described. It will, of course, be understood that the ketones and hydrocarbons referred to are those of higher molecular weight and structure than the reactants.

Now, having described my invention, I claim the following as new and novel:—

1. A process for the synthesis of ketones and hydrocarbons which comprises passing a mixture of olefine gas and acetone vapor at a temperature of 250°–550° C. and at a pressure in excess of 50 atmospheres over a catalyst comprising materials which accelerate hydrogenating and dehydrogenating reactions.

2. A process for the synthesis of ketones and hydrocarbons which comprises passing a mixture of olefine gas and acetone vapor over a contact material comprising hydrogenating and dehydrogenating catalysts, at a temperature of 250°–500° C. and at a pressure in excess of 50 atmospheres, cooling under pressure to liquefy the reaction products, and recovering the reaction products.

3. A process for the synthesis of ketones which comprises passing a mixture of olefine gas and acetone vapor in molecular proportion over a contact material comprising hydrogenating and dehydrogenating catalysts, at a temperature of 250°–500° C., and at a pressure in excess of 50 atmospheres.

4. A process for the synthesis of ketones and hydrocarbons which comprises reacting a mixture of olefine gas and acetone vapor at a temperature of 250°–500° C. and at a pressure in excess of 50 atmospheres.

5. A process for the synthesis of ketones which comprises reacting a mixture of olefine gas and acetone vapor at a temperature of 250°–500° C. and at a pressure in excess of 50 atmospheres.

In testimony whereof I affix my signature.

BRUCE K. BROWN.